United States Patent [19]
Bergeron

[11] Patent Number: 4,957,073
[45] Date of Patent: Sep. 18, 1990

[54] MULTIPLE CONCENTRIC INTAKE/EXHAUST VALVE SYSTEM FOR AN INTERNAL COMBUSTION ENGINE

[76] Inventor: Charles W. Bergeron, 7694 Little John Dr., Apt. #10, Indianapolis, Ind. 46219

[21] Appl. No.: 474,685

[22] Filed: Feb. 6, 1990

Related U.S. Application Data

[63] Continuation of Ser. No. 363,335, Jun. 8, 1989, abandoned, which is a continuation of Ser. No. 205,620, Jun. 2, 1988, abandoned, which is a continuation of Ser. No. 312,871, Nov. 19, 1981, abandoned.

[51] Int. Cl.⁵ .......................... F01L 1/28; F02M 35/10
[52] U.S. Cl. .................... 123/79 C; 123/315; 123/308
[58] Field of Search .................... 123/79 R, 79 C, 308, 123/315, 432, 575, 1 A

[56] References Cited

U.S. PATENT DOCUMENTS

| | | | |
|---|---|---|---|
| 2,045,122 | 6/1936 | Cases | 123/79 C |
| 2,213,202 | 9/1940 | Buchi | 123/79 C |
| 2,863,429 | 12/1958 | Bouteleux | 123/79 C |
| 2,958,316 | 11/1960 | Buchi | 123/79 C |
| 4,275,698 | 6/1981 | Dennetiere | 123/432 |
| 4,317,438 | 3/1982 | Yagi et al. | 123/308 |
| 4,323,046 | 4/1982 | Barber | 123/575 |

FOREIGN PATENT DOCUMENTS

| | | | |
|---|---|---|---|
| 1132837 | 5/1958 | France | 123/315 |
| 0017807 | 2/1978 | Japan | 123/1 A |
| 0589642 | 6/1947 | United Kingdom | 123/315 |

Primary Examiner—Willis R. Wolfe
Attorney, Agent, or Firm—Malin, Haley, McHale, DiMaggio & Crosby

[57] ABSTRACT

An intake and exhaust valve system deployed in an internal combustion engine that improves available charge flow through the engine, provides improved charge turbulence and swirl of charge during each intake stroke for better mixture, provides for multiple independent fuel mixing at the cylinder, allows the use of concentric intake and exhaust valves also providing for balanced charge entry exit symmetry. The intake and exhaust valve system includes using a plurality of three or more concentric valve assemblies per cylinder, each intake valve being mounted within a hollow exhaust valve, the multiple intake and exhaust valves providing optimum flow area entering and exiting the cylinder. Three or more charge passage openings per cylinder strategically disposed enhances the uniform distribution of charge per unit time. Utilization of the present invention greatly increases the fuel efficiency of the engine, reduces emission pollution without sacrificing engine horsepower.

10 Claims, 4 Drawing Sheets

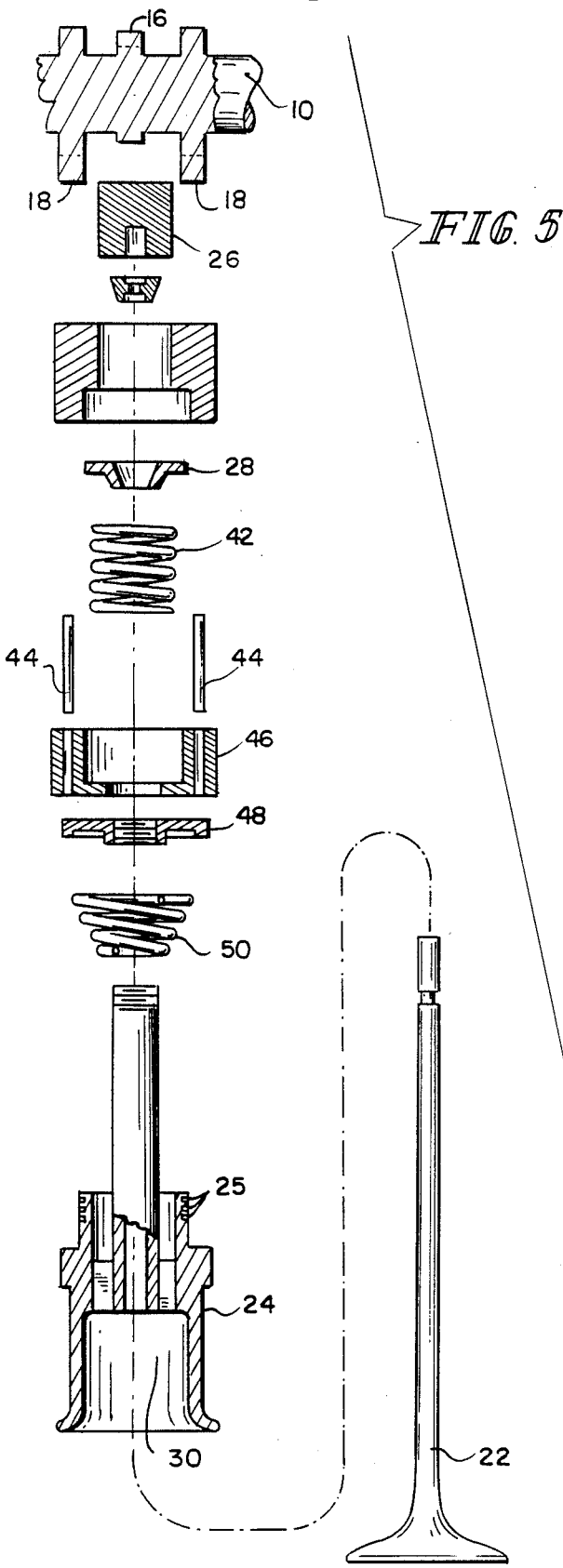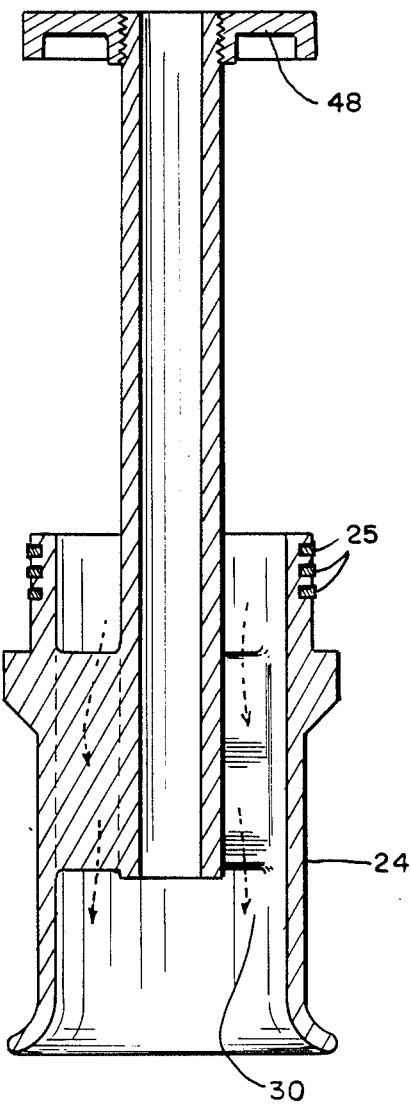
FIG. 5
FIG. 6

MULTIPLE CONCENTRIC INTAKE/EXHAUST VALVE SYSTEM FOR AN INTERNAL COMBUSTION ENGINE

This application is a continuation of application Ser. No. 363,335, filed on June 8, 1989, now abandoned, which is a continuation of application Ser. No. 205,620, filed on June 2, 1988, now abandoned, which is a continuation of application Ser. No. 312,871, filed on Nov. 19, 1981, now abandoned.

BACKGROUND OF THE INVENTION

This invention relates generally to an improvement for an internal combustion engine, and specifically in the intake and exhaust valve system to enhance the charge volume per unit time for intake and exhaust, and provide other improvements for greatly increasing the efficiency of the engine, the total combustion process and the reduction of pollution.

Attempts have been made in the past to employ what are termed "concentric intake and exhaust valve mechanisms" in internal combustion engines. One example is shown in U.S. Pat. No. 1,350,800 issued to Greuter, Aug. 24, 1920, which shows a single concentric intake and exhaust valve system per cylinder employed to afford greater area for inlet and exhaust ports. In order to attempt to achieve an operational model, Greuter discloses a very complex camming system to insure that the intake and exhaust valves are seated properly. Specifically, cam surfaces are used to close the valve as well as open the valve. The great deficiency of Greuter (apart from the extremely complex and expensive camming system which he finds necessary in order to make his system attempt to work) is the massive weight of the single concentric valve assembly. The excessive surface area of the single concentric valve assembly in the combustion chamber creates extreme loading problems resulting from exhaust compression after the combustion stroke because the exhaust valve must open against high gas pressures in the cylinder. The extremely large surface area presented by the single exhaust valve (in conjunction with the surface area of the intake valve) puts great demand on the system, making it impractical of operation. In another system showing a single concentric valve, U.S. Pat. No. 1,950,911 issued to Zahodiakin in Mar. 13, 1934, the patentee discloses a sleeve-like concentric intake and exhaust valve system to reduce the exhaust gas pressure on the exhaust valve. Again the system is quite impractical due to the size and mass of the valves presented. The deficiencies shown in the prior art amplify and clearly demonstrate problems which have not allowed a concentric valve system to be practical in a conventional combustion engine.

The present invention overcomes the problems of the prior art by providing a multiple, concentric intake and exhaust valve system for an internal combustion engine. These improvements are, greatly increased volume of charge per unit time, when coupled with a cam shaft profile of longer duration of full valve opening over the average range of piston travel, through the engine per intake stroke, while at the same time reducing the mass of each concentric valve assembly allowing for conventional type cam and lifter action. This greatly reduces the exhaust pressure on each concentric valve assembly, and enhances the swirl characteristics of the charge by providing the capability of sequential intake of the charge per cylinder by sequentially opening and closing the intake valves in each cylinder.

In the preferred embodiment, four sets of concentric valve assemblies are used per cylinder, which allows for four intake valves and four exhaust valves per cylinder which are disposed to obtain an optimum circumferential valve area for flow into and out of the cylinder.

Improved efficiency is attributed to the increased volume of charge flow per unit time into the cylinder while improving intake charge velocity. The second effect is that by swirling the charge, a more thorough, homogeneous mixture is achieved in the combustion chamber after the intake stroke. This allows a more complete combustion of the charge, deriving more energy per stroke of combustion.

Another benefit of the multiple valve intake and exhaust valve system is that one side of the cylinder can be in fluid communication with one fuel source, and at the same time the other side of the cylinder can be in fluid communication with another fuel source. This allows the mixing of two separate fuels such as gasoline and alcohol in the cylinder. Another important result of the invention is the fact that the increased charge circumferential area available for the intake charge entry and exhaust expulsion (which greatly enhances the volume of flow per unit time through the engine) also reduces the mechanical acceleration demands for lifting the intake and exhaust valves. With the greater circumferential distance achieved, the valves need be opened less to achieve optimum charge volume per unit time. Duration of optimum valve open position is no longer a limiting factor of camshaft acceleration.

The primary problem in conventional, four cycle, internal combustion engines is the inability in the time available per intake stroke to get sufficient charge volume into the cylinder, resulting in low volumetric efficiency in conventional operating RPM ranges. The intake charge volume per unit time is conventionally limited by demands of cam ramp acceleration resulting in time limitations on the duration of full valve opening. The present invention allows for optimum open valve duration.

SUMMARY OF THE INVENTION

A multiple concentric intake/exhaust valve system for an internal combustion engine which employs at least three or more separate concentric intake and exhaust valves per cylinder to provide increased charge volume per unit time to the cylinder, said intake, exhaust valve system having a lifting mechanism that can achieve optimum flow charge volume per unit time.

In the preferred embodiment four concentric intake and exhaust valves are employed. Four circular openings are provided through the cylinder head to each combustion chamber. The openings are sized and geometrically arranged relative to each other to achieve an optimum total circumferential distance per combustion chamber. The intake valve area opening per unit time when coupled with the optimum intake charge velocity in the port determines the volume of charge received in the cylinder. By increasing the total intake valve circumference per cylinder when compared with the total valve circumference in a conventional engine, the lift distance required decreases to achieve the same valve opening area. With the lower lift requirement, the time needed to reach optimum valve opening is decreased. Duration at optimum valve opening is now increased.

This results in a larger mass charge volume per unit time of the intake stroke.

Each opening in the cylinder head receives a concentric intake and exhaust valve assembly, each of which are described in greater detail below. In particular, each intake valve and exhaust valve assembly is similar, so that a single concentric intake and exhaust valve system will be described. The intake valve is a conventionally shaped poppet valve which is coaxially located within a hollow-chambered exhaust valve. The exhaust valve assembly includes a web support having a circular passage that receives and supports the stem of the intake valve.

The exhaust valve, being hollow and having the intake valve mounted therein, includes an exhaust valve lifter that contacts a pair of exhaust lobes on the cam shaft (one lobe that contacts each side of the exhaust valve lifter) to depress exhaust valve driving pins, which are mounted in the main spring support pad. The main spring support pad guides the exhaust valve driving pins which in turn engages the exhaust valve assembly. A main spring is mounted between the spring retainer and the spring support pad. An exhaust valve return spring is mounted between the exhaust valve driving pad and the cylinder head. The intake valve may be of conventional weight and size. An intake valve lifter contacts the intake lobe of the cam, which is located between the exhaust lobes.

Two types of intake manifolds could be employed. A single source, centrally located, manifold may be used to equally supply all four intake valves per cylinder. Alternatively, two separate manifolds could use different types of fuels, each independently supplied to the combustion chamber.

The use of multiple concentric valve assemblies per cylinder allows for balanced intake charge induction and exhaust impulse expulsion.

The exhaust valve is mounted such that the exhaust outlet port surrounds the exterior of the exhaust valve. The exhaust valve is seated in such a way that upon opening, exhaust will be received into the outlet port around the exterior of the exhaust valve.

Incoming charge traverses the inside chamber of the exhaust valve. The intake valve is seated relative to the exhaust valve around the annular rim on the opposite of the exhaust valve seat.

Three cam lobes are presented for each inlet/outlet concentric valve assembly. Dual cams are employed, one with each valve train bank mounted overhead on the cylinder head. In one embodiment, the inner cam lobe is used to drive the intake valve against an intake valve lifter disposed on top of the intake valve stem. An annular exhaust valve lifter which is in communication with exhaust valve driving pins which in turn drive the disc-like exhaust valve driving pad which forms the exhaust valve actuating mechanism.

The present intake and exhaust valve system is mounted in an overhead valve arrangement in the engine cylinder head. The cylinder head as on other conventional engines is removable from the cylinder block. In essence the pistons, the block, the crank shaft, the rods and the like are conventional and do not form a part of the invention. It is the intake and exhaust valve system (including the valve actuating mechanisms) that forms the invention.

In operation, twin cams (one on each side of the engine) can be used to open and close the intake and exhaust valves in their proper sequence. For each cylinder, there are four intake valves and four exhaust valves (in the preferred embodiment). By proper selection of the cam lobes spacing (relative to the cyle) the intake valves can be sequentially opened, rather than opened in unison, to permit the intake of the charge in steps around the upper portion of the cylinder chamber. This can create a swirl effect, caused from the intake valves opening at different times in a particular chamber, thus effecting a more turbulent greater mixing action of the charge with the cylinder. The incoming charge can also act as a cooling agent for the valve assembly in that it passes through the interior of the exhaust valve and over the back face surface of the intake valve.

It is important to realize that in the present system, when compared with some of the prior art concentric valves, the mass of each concentric valve assembly is greatly reduced as is the overall individual inertial effect experienced by the valves during movement. In the prior art, with a single concentric valve assembly encompassing the majority of the combustion chamber, the exhaust gas pressure on the valve faces is too great to permit exhaust valve opening without creating excessive loads on the valve actuating mechanism, greatly diminishing the overall efficiency of the system.

It is an object of this invention to provide an improved valve system for an internal combustion engine that enhances the overall efficiency of the engine, reduces fuel consumption without reducing horsepower, and reduces exhaust emission pollution.

It is an object of this invention to provide increased duration at optimum valve opening.

It is another object of this invention to provide an improved concentric intake and exhaust valve system for an internal combustion engine that increases the available area of optimum intake flow charge per unit time, while reducing inertial loads on the individual concentric valve assemblies.

And yet another object of this invention is to provide an intake and exhaust valve system that allows for multiple charge sources from different systems simultaneously in a given combustion chamber, to allow for mixing at the cylinder.

But yet still another object of this invention is to provide an improved intake and exhaust valve system for combustion engines that enhances the efficiency of combustion by providing swirl of intake charge within the cylinder during intake stroke by sequentially opening the intake valves.

But yet still another object of this invention is to provide an improved intake and exhaust valve system for combustion engines that allows for symmetrical disposition of relative porting and valving within the combustion chamber surface to provide for balanced entry and exit of charge.

In accordance with these and other objects which will be apparent hereinafter, the instant invention will now be described with particular reference to the accompanying drawings.

BRIEF DESCRIPTION OF THE DRAWINGS

FIG. 2A shows a centrally located intake manifold. FIG. 2B shows independently disposed fuel source manifolds.

FIG. 5 shows an exploded view of the intake/exhaust valve assembly.

FIG. 6 shows a side elevational view of an exhaust valve assembly.

PREFERRED EMBODIMENT OF THE INVENTION

Figure 1:
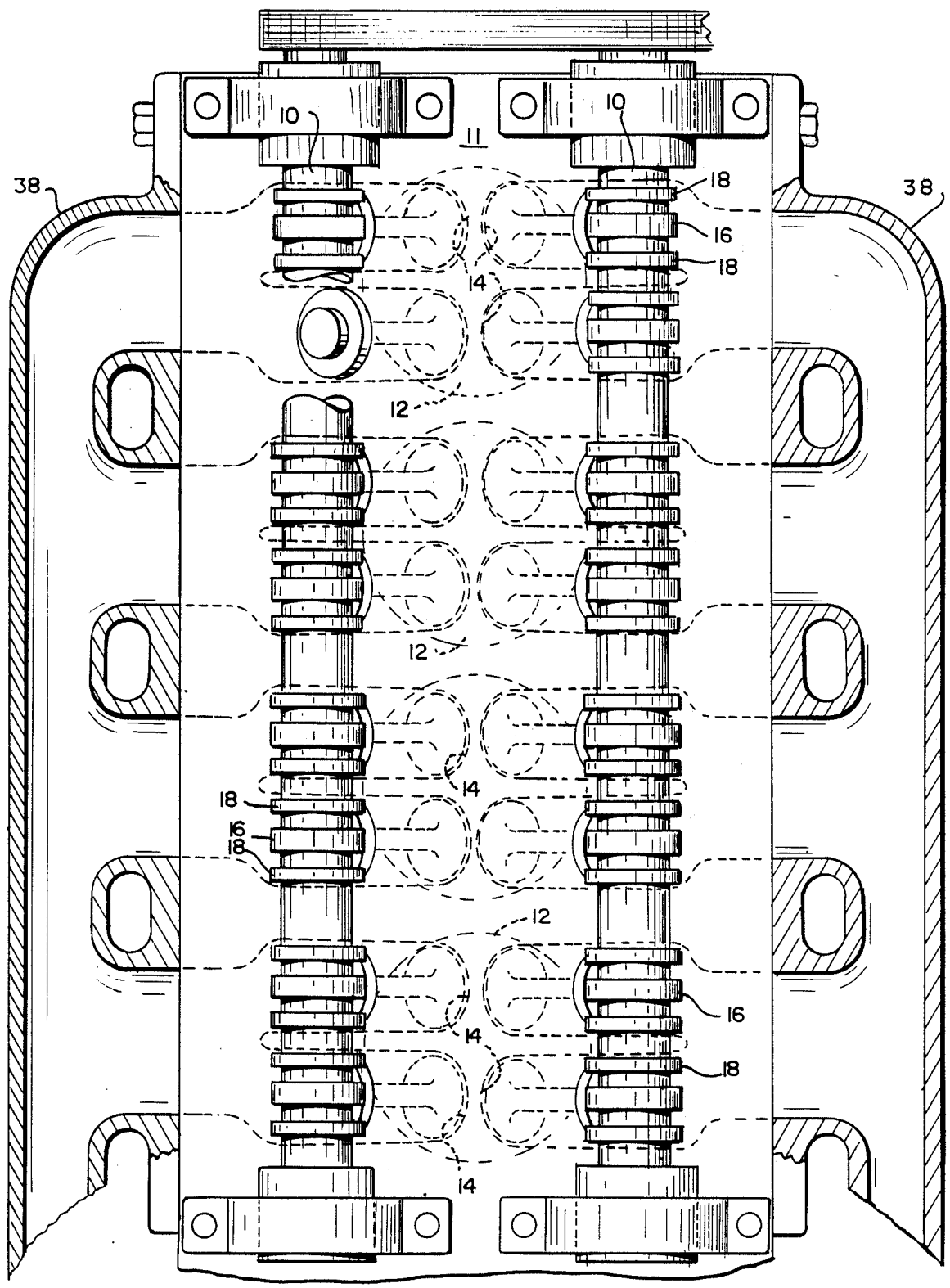
FIG. 1 shows a top plan view, partially in phantom, which shows the overhead valve and cam arrangement and the exhaust manifold untilized in the present invention.

Referring now to the drawings and specifically FIG. 1 a top view showing a pair of cam shafts 10 mounted on top of an engine cylinder head 11 is shown, with the engine cylinders 12 dotted and shown in phantom. Each cylinder also includes four apertures 14 (shown in phantom) which represent the apertures 14 through the top of the head 11 each of which receives one concentric intake and exhaust assembly. Thus for a four cylinder engine as shown, each cylinder will have four intake valves and four exhaust valves with the intake valve being disposed concentrically within the exhaust valve (which is described in greater detail below). Note also that the cam shafts 10 have four sets of three lobes at each cylinder station, with the lobes representing an inner lobe 16 for driving the intake valve and two outside lobes 18, which drive the exhaust valve. The cams 10 may be driven in a conventional manner and are mounted with suitable bearings and oil channels and the like which are not shown for the sake of clarity. The arrangement of the cams 10, however, is basically that of an overhead cam engine. Many essential elements of the engine including the intake manifold, the carburetor, oil covers and the like are not shown in the schematic drawing of FIG. 1.

Figure 2A:
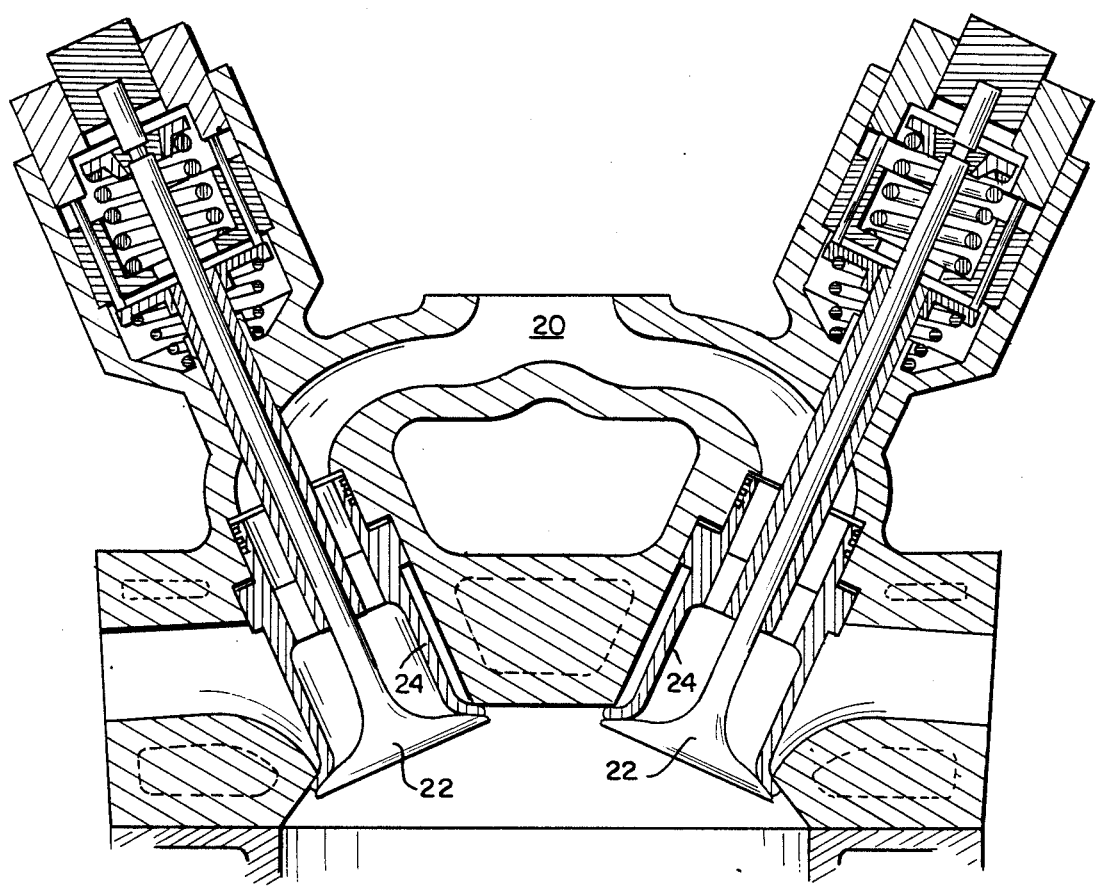
FIGS. 2A and 2B show side elevational views in cross section through a typical cylinder head showing two of four valves deployed in a sinlae combustion chamber, each of the valves being concentric intake and exhaust valves in accordance with the present invention.
Figure 2B:
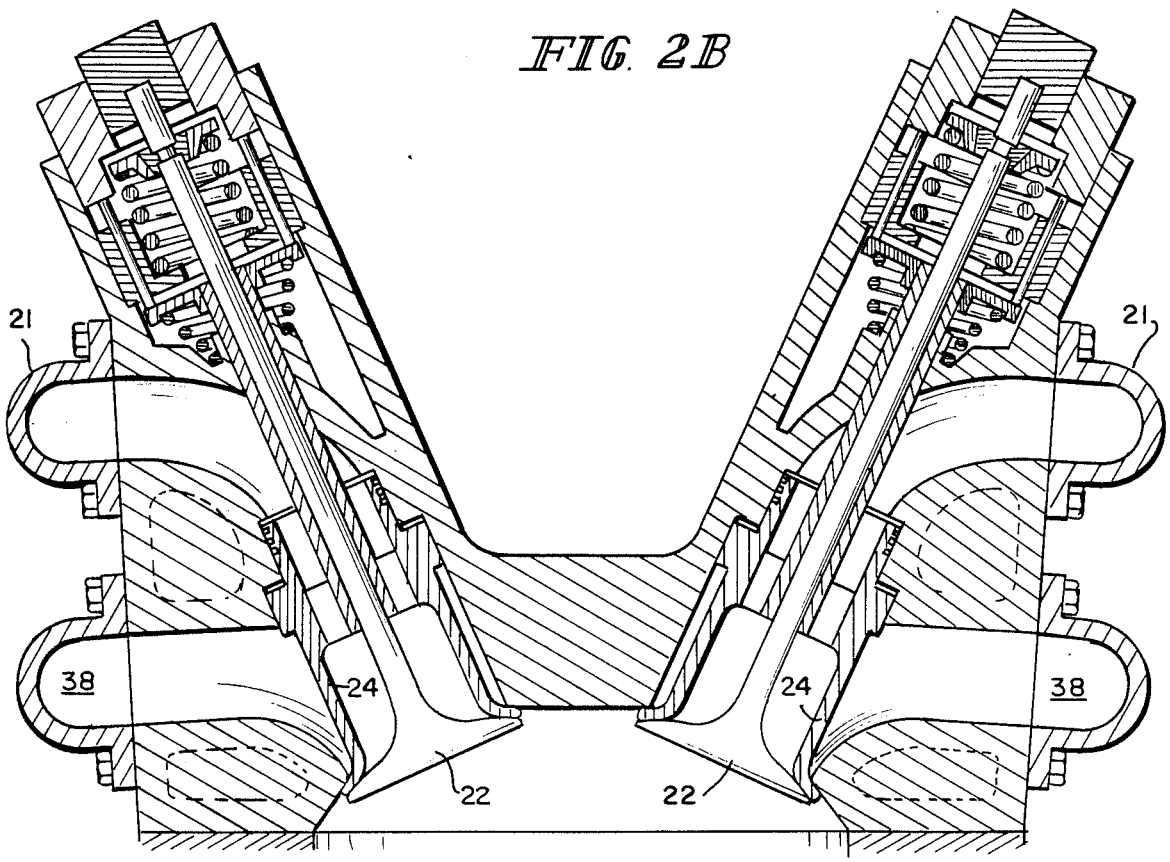

Referring now to FIG. 2A and 2B, a side cross sectional view through two of the intake/exhaust valve assemblies is shown. Each of the intake and exhaust valve assemblies functions the same (except for sequential operation) so that only one will be discussed in detail. Note that the valve assembly axes are somewhat offset from the center of the cylinder, and that each valve assembly is angularly aligned at approximately a 30° angle to each other (angle between the intake valve stems).

The intake manifold 20 of the embodiment shown in FIG. 2A is shown disposed in the center such that it has a split passage from the carburetor where there is a single opening into the carburetor throat terminating with two openings, one at each intake valve 22. The intake manifolds 21 of the embodiment shown in FIG. 2B is shown one each disposed on the two sides of the cylinder head allowing for two different types of fuels each independently supplied to the cylinder.

As shown in this position in FIG. 2A and 2b both the intake 22 and exhaust valves 24 are closed or seated. This is the position during compression.

Figure 3:
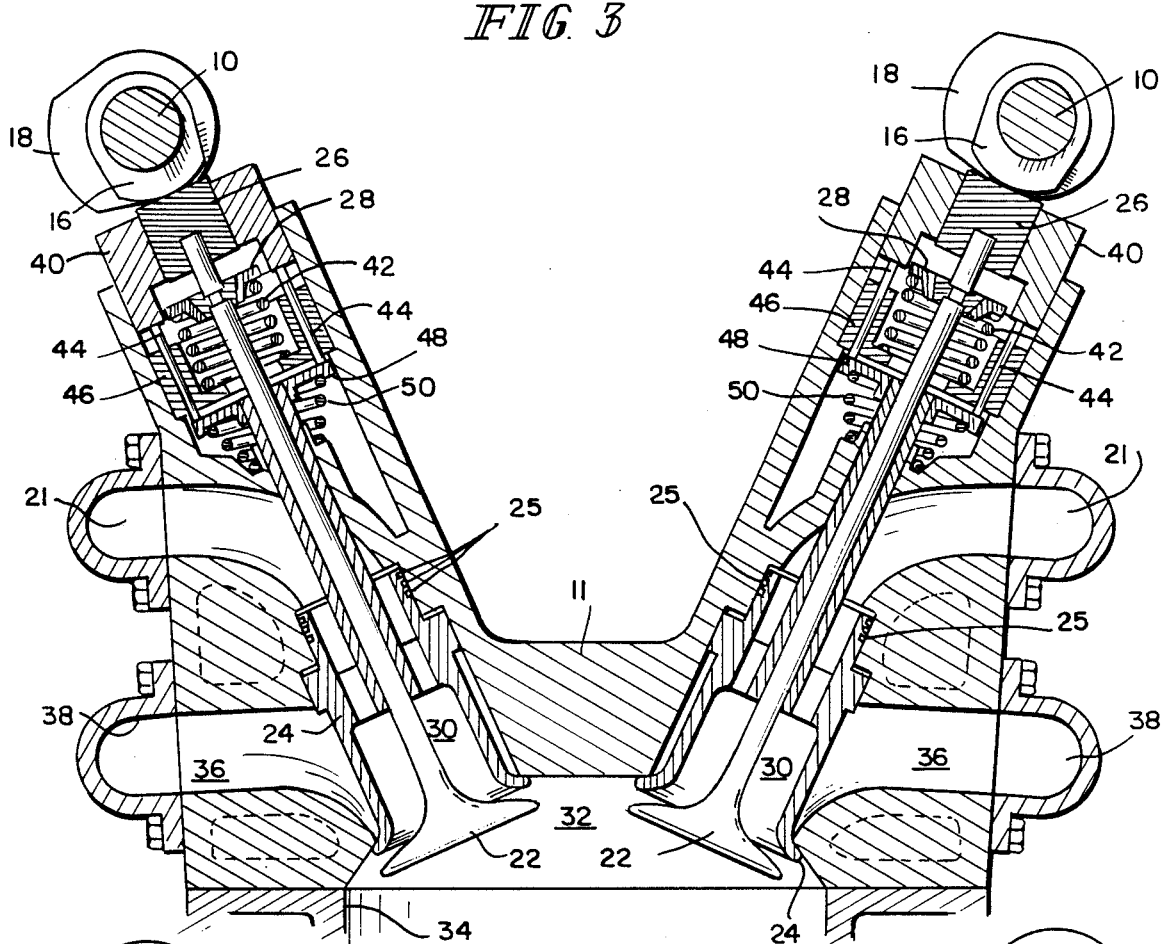
FIG. 3 shows a side elevational view as in FIG. 2 with the intake valve in an open position.

FIG. 3 shows the cam lobes 16 that drive the intake valves 22 in the maximum lift position depressed against the intake valve lifter 26 which in turn depresses the intake valve 22 such that the intake valve is in an optimum open position such as during the intake stroke (while the exhaust valve 24 is held to its seat in a closed position by the exhaust return springs 50 tension). The intake valve 22 includes a solid stem, a valve head, and a groove near the stem end that receives a retainer 28 to hold the intake valve 22 in place. An intake valve lifter 26 mounted at the top of the intake valve stem 22 in contact with the intake valve cam lobe 16. This pushes down on the stem causing the intake valve 22 to open. With the intake valve 22 open, the inner part of the exhaust valve 24 in conjunction with the intake manifold form an intake passage 30 that allows the charge to flow from atmospheric through the intake manifold and the inner passage of the exhaust valve 24 into the cylinder. Note that as shown in FIG. 3 both intake valves 22 are open at the same time. The actual opening and closing of the intake valves 22 in each cylinder could be staged sequentially during the intake stroke to allow for swirling of the charge into the cylinder. Note also that the intake valve 22 does not need to lift very far from its seat to allow for maximum flow charge capacity (although it is shown exaggerated in the drawing). In each combustion chamber 32 there is a total of four intake valves 22 which open as shown in FIG. 3. Thus charge is received through four intake valve openings into a single cylinder 34 providing an optimum amount of charge flow per unit time into the cylinder 34 per unit time. Note however that the intake valve 22 is similar in mass and size to a conventional intake valve.

Figure 4:
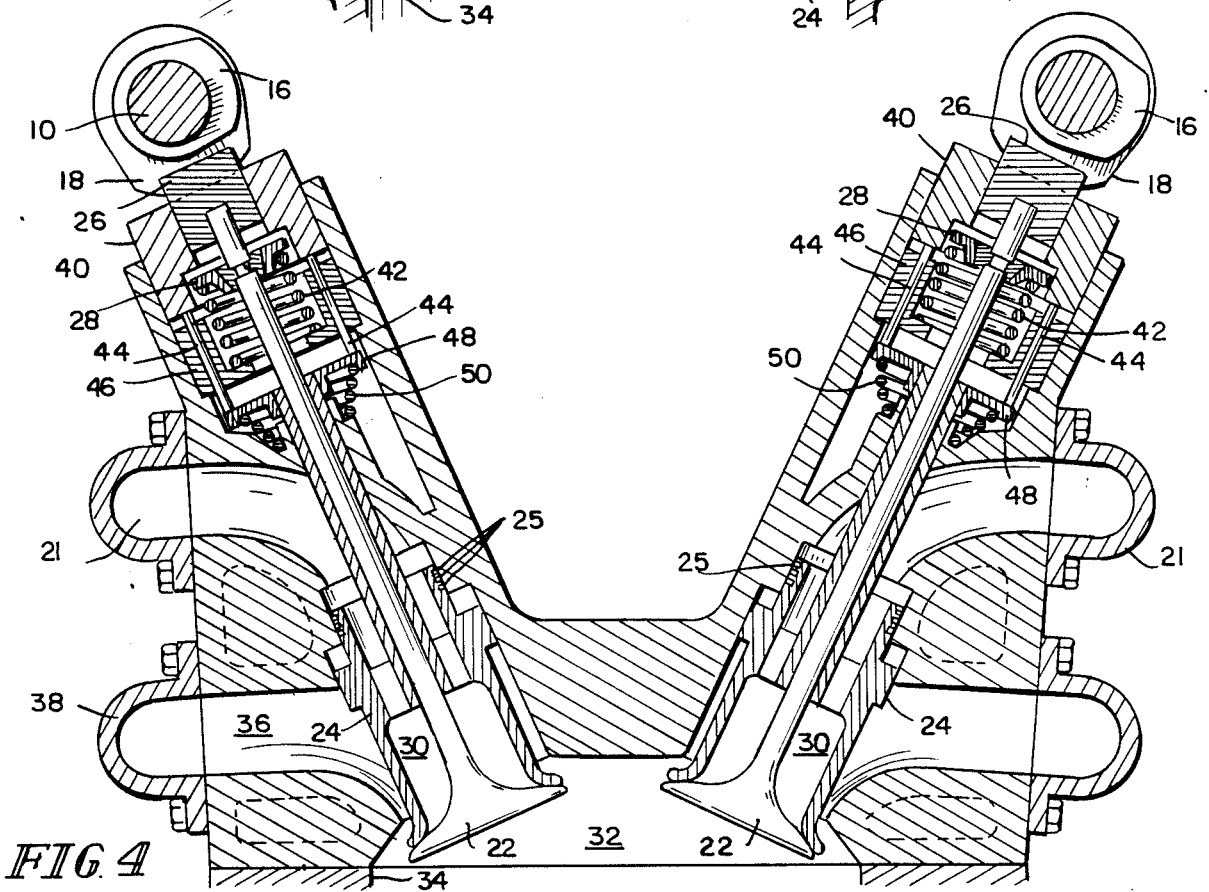
FIG. 4 shows a side elevational view of the present invention as in FIG. 3 with the exhaust valve open and the intake valve closed.

FIG. 4 shows the exhaust valve 24 in the open position during the exhaust stroke to remove exhaust gases from the cylinder 34 after combustion. The intake valve 22 in this position is closed. The exhaust valve 24 is surrounded by an exhaust port 36 that feeds directly to the exhaust manifold 38.

Each exhaust valve 24 is lifted open by a pair of exhaust lobes 18 on the cam on the cam 10 that engage the exhaust valve lifter 40 on each side of the lifter 40 in a balanced or symmetrical fashion. The exhaust valve lifter 40 in turn, when forced downwardly against the main spring 42 tension, forces four exhaust valve driving pins 44 (also symmetrically disposed throughout the spring support pad and guide 46) depressing the exhaust valve driving pad 48. As the exhaust valve driving pad 48 is depressed, the exhaust valve 24 is moved by pressure against its inner sleeve, (that also acts as a guide for the intake valve 22) to the open position, as shown in FIG. 4. Note that the mass of the exhaust valve 24 and the diameter thereof is quite small when compared to exhaust valves of prior art single concentric valve systems. The intake valve 22 seat is on the annular rim portion of the exhaust valve 24.

The exhaust valve 24 must have substantial sealing around it to prevent the leakage of hot exhaust gases into the intake manifold. Annular sealing rings 25 are shown. As the cam 10 continues to rotate and the lobes 18 are reducing lift, the main spring 42 tension, in conjunction with the tension of the exhaust valve return spring 50, cause the exhaust valve 24 to return to its seat in the cylinder head aperture. Every cylinder will include four exhaust valves 24 and four exhaust ports 36 which feed into exhaust manifolds 38 on each side of the engine.

FIG. 5 shows an exploded view of a representative concentric valve assembly. The spring tensions of the main spring 42 and the exhaust valve return spring 50 are selected so that the intake valve 22 can open while the exhaust valve 24 remains seated on the aperture such that when the exhaust valve 24 opens, the intake valve 22 remains seated against the exhaust valves combustion chamber face. In addition the spring tensions are selected so that no unnecessary vibrations or harmonic actions occur from the rapid reciprocal motions which would force the valves to separate relatively from each other during periods when it is not desirable for either valve to be off its seat.

Referring back to FIG. 1, again it can be seen that each cylinder 12 achieves an optimum combined valve circumferential distance with optimum valve opening for optimum charge flow per unit time relative to the cylinder diameter. This greatly increases the volume of charge flow per unit time through the engine, increasing the overall efficiency as described above. Secondly, it can be seen from FIG. 1 that by proper degree selection of the cam lobes relative to ramp opening, the intake valves can be staggered (sequentially opened) during each intake stroke. This allows for charge swirl which enhances homogeneous mixing in addition to increased charged flow. This greatly enhances the overall combustion because of the homogeneous distribution of fuel and oxygen molecules throughout the charge and their respective distribution uniformly throughout the combustion chamber at compression.

THEORY OF OPERATION

The optimum charge flow per unit time into and out of each cylinder is determined by the total circumferential distance available considering all of the multiple intake valves and the distance that each valve opens per unit time. The employment of multiple concentric valves of proper size (as large as practicable) achieves a greater total valve circumferential distance than the circumference of the cylinder in which the valves are deployed. This can not be geometrically achieved with multiple individual intake and exhaust valves which must compete with each other circumferentially within the confines of the cylinder area, or with a single concentric valve, the maximum circumference of which is theoretically the circumference of the cylinder. Although two concentric intake/exhaust valves of equal maximum diameters could theoretically approach the circumference of the cylinder, practical limitations on the valve diameters required to allow for cooling passages and valve seats make this not practicaL without going to exotic non-conventional designs such as having the valves canted at an angle.

It can be geometrically proven that three or more concentric intake/exhaust valves of equal diameter, sized to maximum practical limits within the cylinder area while permitting sufficient spacing between adjacent valves, will obtain a total circumferential distance (combining the circumferences of all three valves) that exceeds the circumference of the cylinder. With such a large amount of valve circumference available, the maximum valve lift required when compared with a conventional internal combustion engine having individual intake and exhaust valves is greatly reduced. This permits employment of a less steep cam lobe profile and a longer duration of maximum valve opening for each intake stroke such that the intake valve is at maximum lift while the piston (during the intake stroke) is at maximum velocity. The result is that a greatly increased volumetric efficiency can be obtained in a naturally asperated four stroke, internal combustion engine. For example, using four concentric intake and exhaust valves as described in the preferred embodiment, each having a diameter of one and seven-eighths inches, deployed in a cylinder having under a four inch diameter, the maximum intake and exhaust valve lift necessary to achieve increased volumetric efficiency is 0.100 inches.

What I claim is:

1. An intake and exhaust valve system for an internal combustion engine to improve charge intake density per unit time comprising:
    a cylinder;
    a cylinder head having at least three intake and exhaust charge ports in fluid communication with said cylinder, said ports each having an exhaust valve seat;
    at least three or more individual concentrically disposed intake and exhaust valves, each concentric intake and exhaust valve including a circular intake poppet valve, a cylindrically-shaped exhaust valve having an annular intake valve seat portion that engages a portion of said intake valve when said intake valve is closed and a second annular portion for engaging said exhaust valve seat, said intake valve being concentrically disposed inside said exhaust valve;
    means for positively seating each of said intake and exhaust valves;
    said intake valves each having a diameter sized such that the sum total of the circumferences of the first, second, and third intake valves exceeds the circumference of the combustion chamber;
    means for individually lifting each of said intake and exhaust valves to a predetermined distance as a function of the total intake valve circumferential distances above each respective valve seat for a predetermined duration relative to the respective intake and exhaust stroke of the engine to obtain maximum volumetric efficiency of said engine.

2. In a four stroke internal combustion engine having at least one cylinder and a cylinder head having at least three ports into each cylinder, an intake and exhaust valve system for increasing the intake charge volumetric efficiency of each cylinder at a relatively low maximum intake valve lift comprising:
    at least three separate concentric intake and exhaust valve assemblies per cylinder, each assembly having a separate outer cylindrical exhaust valve and a separate inner poppet intake valve, said outer exhaust valve being concentrically disposed about said inner poppet intake valve, and including an annular intake valve seat, each assembly disposed in a cylinder head port such that the outer exhaust valve seats with the cylinder head port and the inner intake valve seats with the outer exhaust valve, the intake valve circumferential distance being sized such that the total circumferential distances of the sum of the three intake valves is greater than the sum of the circumference of the cylinder; and
    first spring means for closing each intake valve independently;
    second spring mans for closing each exhaust valve independently; and
    means for lifting each valve to a predetermined height, said predetermined height being selected as a function of the total circumferential distances of the intake valves to allow maximum charge volume into the cylinder during the intake stroke.

3. A method for increasing the volumetric efficiency of a four stroke internal combustion engine comprising the steps of:

(a) deploying at least three concentrically disposed intake and exhaust valve assemblies, each assembly having an intake valve and an exhaust valve concentrically disposed relative to each other in fluid communication with each combustion chamber, the diameters of the intake and exhaust valves being sized such that the total circumference of the three intake valves exceeds the circumference of the cylinder; and (b) opening the intake valves and the exhaust valves to a predetermined height and for a predetermined duration as a function of the intake valve total circumferential distance relative to the intake and exhaust strokes respectively to obtain maximum volumetric efficiency for said engine.

4. An intake and exhaust valve system deployed in a four stroke, internal combustion engine for improving intake and exhaust charge volume per unit time in each cylinder comprising:

at least three concentric intake and exhaust valve assemblies, each assembly having a separate poppet intake valve and intake valve seat and a separate cylindrical exhaust valve and exhaust valve seat, said intake valve being concentrically disposed relative to said exhaust valve, mounted in fluid communication with each engine cylinder;

means for opening said intake valves coupled to said intake valves;

means for opening said exhaust valves coupled to said exhaust valves;

intake valve spring connected to each intake valve for closing each intake valve independently;

exhaust valve spring connected to each exhaust valve for closing each exhaust valve independently;

said intake valves each having a diameter size substantially equal to each other and strategically selected such that the sum total of the circumferences of the first, second, and third intake valves exceed the circumference of the combustion chamber;

whereby the available intake valve opening area of the combustion chamber is a function o the sum total of the circumferences of each intake valve multiplied by the valve lift height for a predetermined time to provide optimum charge density for maximum volumetric efficiency.

5. A valve system as in claim 4, wherein:
the combined intake valve lift and intake valve circumferential distance is determined by the optimum flow charge capability of the port to produce maximum charge volume per unit time for a given cylinder volume.

6. A valve system as in claim 4, including:
a cylinder head, said head having at least three apertuers per engine cylinder, each of said apertures receiving a concentric intake and exhaust valve assembly; and means for mounting each of said intake and exhaust valve assemblies in said cylinder head apertures.

7. A valve system as in claim 6, wherein:
said cylinder head apertures are symetrically disposed on each side of the central longitudinal axis of said cylinder.

8. A valve system as in claim 6, wherein:
said cylinder head includes at least one intake charge passage in fluid communication with said intake valves and an exhaust passage in fluid communication with said exhaust valves.

9. A valve system as in claim 8, including:
means for opening said intake valves sequentially in time relative to the beginning of the intake stroke thereby producing charge swirl in aid cylinder during the intake stroke.

10. A valve system as in claim 8, including:
a first charge source coupled in fluid communication with one of said intake valves through a first intake charge passage; and a second charge source, independent of said first charge source, coupled in fluid communication with a different intake valve, whereby said engine can utilize two different fuels that are mixed after receipt into said cylinder.

* * * * *